United States Patent [19]
Rhee

[11] 3,949,163
[45] Apr. 6, 1976

[54] PULSE WIDTH CONTROL AND ADVANCING CIRCUIT

[75] Inventor: Dong Woo Rhee, Williamsville, N.Y.

[73] Assignee: GTE Sylvania Incorporated, Stamford, Conn.

[22] Filed: Feb. 27, 1974

[21] Appl. No.: 446,496

[52] U.S. Cl. ................. 178/7 R; 328/157; 307/265
[51] Int. Cl.² ... H04N 5/44; H03K 5/20; H03K 1/18
[58] Field of Search . 178/DIG. 26, 7.3 DC, 7.5 DC, 178/7.3 R, 7.3 S, 7.5 R, 7.5 S, 7.1, 7.2, 69.5 TV, 69.5 G; 307/261, 265, 267; 328/34, 59, 61, 63, 129, 137, 157, 158

[56] References Cited
UNITED STATES PATENTS

| | | | |
|---|---|---|---|
| 2,469,227 | 5/1949 | Fraser | 328/59 |
| 2,930,848 | 3/1960 | Fathauer | 178/69.5 G |
| 3,059,052 | 10/1962 | Smith et al. | 178/69.5 G |

*Primary Examiner*—Robert L. Griffin
*Assistant Examiner*—John C. Martin
*Attorney, Agent, or Firm*—Norman J. O'Malley; Thomas H. Buffton; Cyril A. Krenzer

[57] ABSTRACT

A signal receiver responsive to a composite signal with video and pulse signal information includes circuitry for developing pulse signals having a width greater than the pulse signals in the composite signal and for effecting an advance in one of the developed signals with respect to one of the pulse signals of the composite signal whereby the pulse signals are removed from the composite signal to permit employment of the video information for determining the black level of a display.

10 Claims, 7 Drawing Figures

PULSE WIDTH CONTROL AND ADVANCING CIRCUIT

CROSS-REFERENCE TO OTHER APPLICATIONS

A concurrently filed application entitled "Peak Detector Sample and Hold Circuit" bearing U.S. Ser. No. 446,397 and filed in the name of the present inventor relates to circuitry for detecting peak black and white video signal levels. Also, a concurrently filed application entitled "Automatic Video Signal Control Circuit" bearing U.S. Ser. No. 446,396 and filed in the name of the present inventor relates to circuitry for developing black and white picture levels from peak black and combined average peak white video signals.

BACKGROUND OF THE INVENTION

The following disclosure will be discussed in terms of a television receiver although it is to be understood that other and further applications and uses are also appropriate. In television receivers, it is a common practice to utilize blanking pulses at the horizontal and vertical scan frequency which are available in the transmitted composite television signal. As is well known, the horizontal blanking pulse is utilized to blank the electron beam of a cathode ray tube or display device intermediate the end of one horizontal scan line and the beginning of another. Similarly, the vertical blanking pulse is employed to blank the cathode ray tube display device during the period required to return the electron beam from the bottom to the top of the display device. Moreover, it is also well known that the horizontal blanking pulse can be employed to provide a black level setting for the signal receiver.

As mentioned above, most television receivers utilize the blanking pulse to provide a desired black level for the signal receiver. Unfortunately, present-day television signals tend to have a varying magnitude which tends to provide an undesired varying blanking pulse and a varying black level as evidenced on the display device or cathode ray tube. Since the variations in black level are deleterious to the viewing pleasure, one approach for improved viewing is the utilization of the maximum video signal rather than the horizontal blanking pulse as a means of determining the black level of the display device.

However, a system which employs a maximum video signal rather than the blanking pulses for determining black level requires removal of the blanking pulse from the received composite signal. Otherwise, the level of the blanking pulses may exceed the level of the video signal whereupon the black level would undesirably tend to be determined by the blanking pulse rather than the video signal level.

Additionally, the composite signal ordinarily employs blanking pulses at both the horizontal and vertical scan frequencies. Also, these horizontal and vertical blanking pulses are vastly different from one another in so far as width and frequency are concerned. Thus, removal of pulse signals of varying frequency and width without deleterious effect on a display device becomes a task of major proportions.

OBJECTS AND SUMMARY OF THE INVENTION

An object of the present invention is to provide an enhanced television receiver. Another object of the invention is to provide a television receiver having an improved black level. Still another object of the invention is to enhance the black level of a display device by removal of the blanking signals and utilization of a maximum video signal applied thereto. Still another object of the invention is to provide signals at horizontal and vertical frequencies, of a given magnitude, and of a width greater than the normal width of the horizontal and vertical blanking pulse signals. A further object of the invention is to provide a signal of a given magnitude having a width greater than the width of a vertical blanking signal and advanced with respect to the vertical signal appearing in a transmitted television signal.

These and other and further objects and advantages and capabilities are achieved in one aspect of the invention by a pulse width control and pulse advancing circuit which includes first and second trigger circuits coupling first and second signal sources to first and second charge storage networks whereby the first trigger circuit means and first charge storage network are utilized to provide an output signal having a width greater than the signal available from the first signal source and a second trigger circuit means is employed to shift the threshold level of the first trigger circuit means to effect utilization of a second charge storage network and provide an output signal having a width greater than the width of the signal available from the second signal source.

In another aspect of the invention, a clamping circuit means is coupled to the second trigger circuit means and to the second signal source to provide an output signal advanced with respect to the signal available from the second signal source. Thus, circuitry is combined to provide an output signal widened with respect to the second signal source and also advanced with respect to the second signal source.

DESCRIPTION OF THE PREFERRED EMBODIMENT

For a better understanding of the present invention, together with other and further objects, advantages and capabilities thereof, reference is made to the following disclosure and appended claims in connection with the accompanying drawings.

Figure 1A:
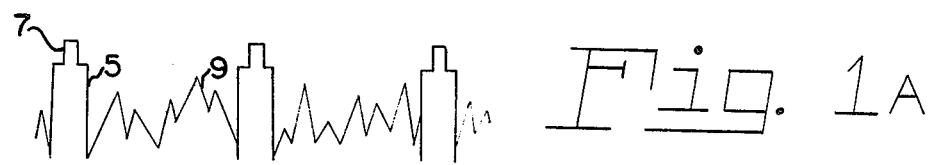
FIGS. 1A, 1B, and 1C provide a graphic illustration of the first or horizontal frequency pulse signal including the incoming video signal containing the blanking pulses, a flyback pulse derived therefrom, and a resultant widened pulse derived by circuitry of the application.
Figure 1B:
Figure 1C:
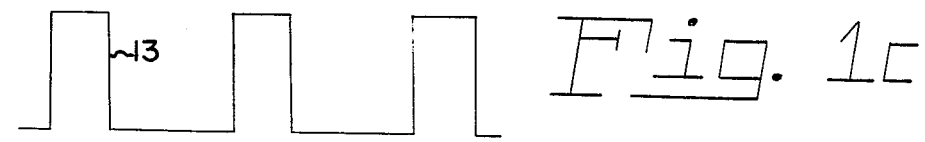

Referring to FIG. 1 of the drawings, FIG. 1A illustrates a composite video signal which includes a horizontal blanking pulse signal 5, a synchronizing pulse signal 7 riding thereon, and a video signal 9 disposed intermediate the horizontal blanking pulse signals 5. FIG. 1B illustrates a flyback pulse signal normally derived in a signal receiver. FIG. 1C illustrates a widened signal 13 provided by the disclosed circuitry and derived in response to activation of the circuitry by the flyback pulse signals at the horizontal scan rate.

Figure 2A:
FIGS. 2A, 2B and 2C provide a graphic illustration of an incoming voltage waveform suitable for application to a vertical deflection yoke, an output signal available from a clamping circuit, and a widened and advanced signal derived therefrom and suitable for cancelling a blanking signal.
Figure 2B:
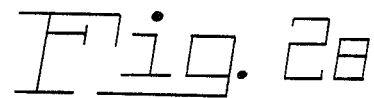
Figure 2C:

FIG. 2A illustrates a voltage waveform suitable for application to a vertical deflection yoke to provide a vertical trace period 15 and a vertical retrace period 17. FIG. 2B illustrates the output available from a clamping circuit wherein the above-mentioned voltage waveform 2A is clamped at a point 18 prior to attaining a maximum value. Thus, the output signal available from the clamping circuitry is advanced as compared with the applied voltage waveform 2A at a vertical scan frequency. FIG. 2C illustrates an output signal available from the disclosed circuitry wherein the output signal is not only advanced with respect to the applied vertical waveform signal but also widened with respect to the normal vertical blanking period. Thus, there is provided not only a widened signal at the horizontal scan frequency but also a widened and advanced signal at the vertical scan frequency.

Figure 3:
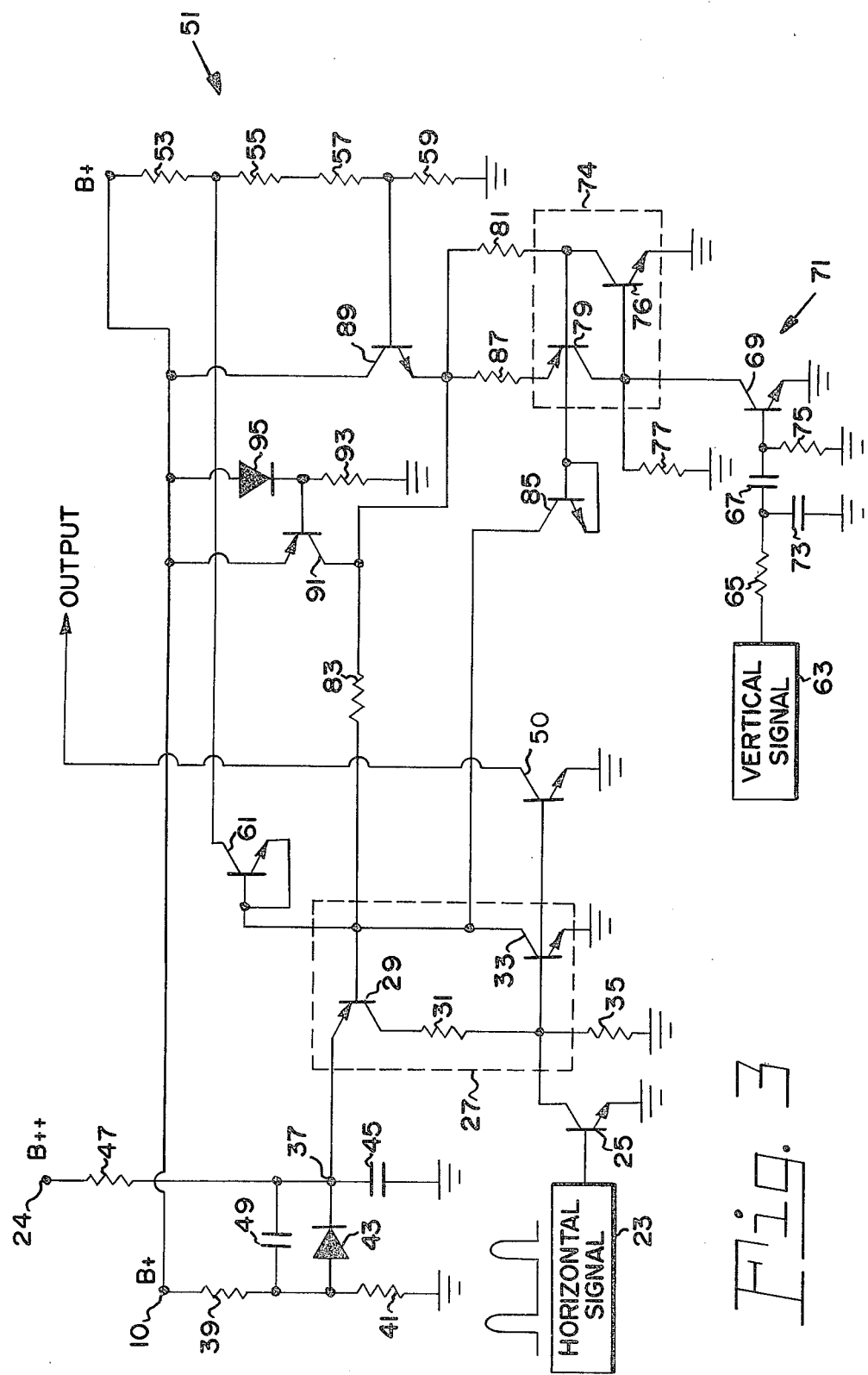
FIG. 3 is a diagrammatic illustration of a preferred embodiment of a pulse width control and advancing circuit.

Referring to FIG. 3 of the drawings, the preferred form of pulse width control and advancing circuitry includes a first signal source 23 coupled to the base of a transistor 25 having a grounded electrode and a collector electrode coupled to a first trigger circuit means 27. The first trigger circuit means 27 includes a first transistor 29 having a collector electrode coupled by a resistor 31 to the collector or output of the transistor 25 and to the base of a second transistor 33 of the first trigger circuit means 27. The base of the second transistor 33 is coupled to circuit ground by way of a resistor 35 while the emitter electrode is coupled directly to circuit ground. The collector of the second transistor 33 is connected to the base of a first transistor 29. The emitter of the first transistor 29 is connected to a junction point 37 associated with a first and second charge storage network.

The first charge storage network includes a first potential source B+ connected to a potential reference level by series connected resistors 39 and 41. The junction 37 is also connected to the junction of the resistors 39 and 41 by way of a diode 43. Moreover, a capacitor 45 couples the junction 37 to a potential reference level.

A second charge storage network includes a resistor 47 coupling the junction 37 to a second potential source B++. Also, the junction 37 is coupled by a capacitor 49 to the junction of the resistors 39 and 41 of the first charge storage network. Moreover, the capacitor 45 of the first charge storage network is coupled intermediate the junction 37 and and the potential reference level, and is utilized in conjunction with the condenser 49 to provide a second charge storage network.

The base of the second transistor 33 of the first trigger circuit means 27 is also coupled to the base of an output transistor 50. The output transistor 50 has an emitter coupled to a potential reference level and a collector coupled to an output circuit. A voltage divider 51 includes resistors 53, 55, 57 and 59 series connected intermediate the first potential source B+ and a potential reference level. The junction of resistors 53 and 55 is coupled by way of a diode connected transistor 61 to the base of the first transistor 29 of the first trigger circuit means 27.

A second signal source or signal source at a vertical scan frequency 63 is coupled by way of a resistor 65 and capacitor 67 to the base of a transistor 69 of a clamping circuit means 71. The junction of the resistor 65 and capacitor 67 is coupled to circuit ground by a capacitor 73. The junction of the capacitor 67 and the base of the transistor 69 is coupled to circuit ground by a resistor 75. The emitter of the transistor 69 is directly connected to circuit ground while the collector is coupled to a second trigger circuit means 74.

The second trigger circuit means includes a first transistor 76 having an emitter connected to circuit ground and a base connected to circuit ground by way of a resistor 77. The collector of the first transistor 76 is connected to the base of a second transistor 79 having a collector connected back to the base of the first transistor 76. The base of the second transistor 79 is connected by series coupled resistors 81 and 83 to the base of the first transistor 29 of the first trigger circuit means 27. Also, the base of the first transistor 79 is coupled by way of a diode-connected transistor 85 to the base of the transistor 29 of the first trigger circuit means 27.

The emitter of the second transistor 79 of the second trigger circuit means 73 is connected by way of a resistor 87 to the junction of the resistors 81 and 83 and to the emitter of a transistor 89. Transistor 89 has a base coupled to the junction of resistors 57 and 59 of the voltage divider means 51 and the collector coupled to a first potential source B+. Also, a transistor 91 has an emitter coupled to the first potential source B+ and a collector coupled to the junction of the resistors 81 and 83 and the emitter of the transistor 89. The base of the transistor 91 is coupled to circuit ground via the resistor 93 and also coupled to the supply potential B+ via a diode 95.

As to operation, it may be briefly stated that the first trigger circuit means 27 has a given threshold level and in response to a signal at the horizontal scan rate from the first signal source 23 acts in conjunction with the first charge storage network to provide a signal at the output transistor 50 having a width greater than the width of the applied signal from the first signal source 23. Also, a signal at the second signal source 63, at the vertical scan frequency for example, is applied to the clamping circuit means 71 wherein an output signal advanced with respect to the applied signal is provided. This advanced output signal is applied to the second trigger circuit means 74 whereby the threshold level of the first circuit means 27 is shifted. The shift from a first to a second threshold level of the first circuit means 27 in conjunction with the second charge storage network provides an output signal at the output transistor 50 which is not only wider than but also advanced in time with respect to the signal applied to the second or vertical signal source 63.

More specifically, it may be assumed that a transistor 25 is in a non-conductive state with the first trigger circuit means 27 in the conductive state. Thus, the first and second transistors 29 and 33 of the first transistor means 27 are conducting heavily whereupon the potential at the junction 37 is at a relatively low value of about 0.8 volts for example.

Also, the collector of the second transistor 33 of the first trigger circuit means 27 is at a relatively low value of about 0.2 volts whereupon the second trigger circuit means 74 is rendered conductive by way of the diode-connected transistor 85. Since the second trigger circuit means 74 is conductive the potential appearing at the emitter of the transistor 89 would have a value of approximately 2.7 volts. However, the threshold voltage appearing at the base electrode of the first transistor 29 of the first trigger circuit means 27 would have a value of about 0.2 volts since the first trigger circuit means 27 is conductive.

Assuming an input signal from the first signal source 23, a flyback pulse signal for example, is applied to the transistor 25, the transistor 25 will be rendered conductive whereupon the first and second transistors 29 and 33 respectively of the first trigger circuit means 27 will be rendered non-conductive. Since the first transistor 29 has a threshold or base electrode potential level in the region of about 2.7 volts and is in a non-conductive state, the voltage at junction 37 or the emitter of the transistor 29 will begin to increase due to the charging of the capacitor 45 by way of the first potential source B+, the series connected resistors 39 and 41, and the conductive diode 43. At some period of time as determined by the time constant of the above mentioned components forming the first charge storage network, the potential at the junction 37 and emitter of the first transistor 29 will reach a value substantially equal to the threshold value of 2.7 volts plus 0.7 volts whereupon the transistors 29 and 33 will be rendered conductive. Moreover, thee transistors 29 and 33 of the first trigger circuit means 27 will be rendered conductive only so long as the transistor 25 is in a non-conductive state since conduction of the transistor 25 turns off the transistor 29 and 33.

If it is assumed that the time constant of the first charge storage network is such that the period required to attain a voltage at the junction point 37 in an amount sufficient to render the first trigger circuit means 27 conductive is greater than the period of the pulse signal applied from the first pulse signal source 23, it can be readily seen that the resultant output pulse signal will be wider than the pulse signal applied from the first pulse signal source 23. Thus, the circuitry provides an output pulse signal initiated at the same time as an applied pulse signal but extending beyond the presence of the applied pulse signal.

Assuming a signal, such as the voltage wave-form for the vertical deflection yoke illustrated in FIG. 2A, is applied from the second vertical signal source 63 by way of the clamping circuit means 71 to the second trigger circuit means 74, the first and second transistors 76 and 79 of the second trigger circuit means 74 will be turned off or rendered non-conductive. Thereupon the potential appearing at the emitter of the transistor 89, due to the heavy conduction of the transistor 91, will approach the level of the first potential source B+.

Therefore, the threshold potential or base potential of the first transistor 29 of the first trigger circuit means 27 will increase to a value determined by the diode-connected transistor 61 and the junction of the resistors 53 and 55 of the bias circuit network 51. Since the base or threshold potential of the first transistor 29 of the trigger circuit means 27 is at an increased value, about 8.4 volts for example, it is obvious that the potential at the junction 37 will have to greatly increase in order to exceed the potential previously available at this junction 37. In other words, the potential at the junction 37 will have to approach the value of the second threshold level in order that the first trigger circuit means 27 will again be rendered conductive.

Since the first potential source B+ may not provide enough voltage at the junction 37 to overcome the above mentioned second threshold level at the base of the first transistor 29 of the first trigger circuit means 27, the second charge storage network and second and greater potential source B++ will have to be utilized to provide the desired control of the first trigger circuit means 27. Thus, the second potential source B++ and the second charge storage network including the resistor 47 and capacitors 45 and 49 must be employed to provide the desired potential at the junction 37. Preferably, the second charge storage network has a time constant about one hundred times the time constant of the first charge storage network.

The resistors 39 and 41 have about 100 times less resistances than the resistor 47. Thus, the potential at the junction of the resistor 39 and 41 is about one half of the potential from the first potential source B+. When the potential at the junction 37 is higher than the junction of the resistors 39 and 41, the diode 43 is reverse biased and non-conductive and the capacitor 49 is effective as the second charge storage network.

Also, when the potential at the junction 37 is of an amount sufficient to overcome the second threshold potential at the base of the first transistor 29 of the first trigger circuit means 27, the first and second transistors 29 and 33 of the first trigger circuit means 27 will be rendered conductive. Thereupon, an output pulse signal available from the output transistor 50 will have a width greater than the width of the signal available from the second signal source 63 as determined by the time constant of the second charge storage network previously described.

Additionally, it is to be noted that the clamping circuit means 71 including the capacitor 67 and resistor 75 may be adjusted to clamp the applied signal from the second signal source 63 prior to the attainment of a maximum value. In this manner the output available from the transistor 69 of the clamping circuit means will be advanced with respect to the signal available from the second signal source 63. This advancement in the output from the transistor 69 with respect to the applied signal in conjunction with the widening thereof with respect to the applied signal by the utilization of the second charge storage network, as previously described, provides not only a widened pulse signal but also an advanced pulse signal at the vertical scan frequency rate.

Thus, there has been provided a unique pulse width control and pulse advancing circuit especially suitable for use with a television receiver. The circuitry not only provides for a signal widened with respect to applied first and second signals arriving at random rates but also provides for the advancement of the signal with respect to an applied signal. Also, the system is applicable to either regular periodic pulse chains or random periodic pulse chains. Moreover, this system is readily integratable with a limited number of pins and external connections required.

While there has been shown and described what is at present considered the preferred embodiment of the invention, it will be obvious to those skilled in the art that various changes and modifications may be made therein without departing from the invention as defined by the appended claims.

What is claimed is;

1. In a signal receiver having first and second potential sources, first and second signal sources providing first and second signals at first and second frequencies respectively with said second signal having ramp and flyback pulse signal portions, a pulse width control circuit comprising:
   first and second charge storage networks having first and second time constants and coupled to said first and second potential sources respectively;

first trigger circuit means coupled to said first signal source and to said first and second charge storage networks, said first trigger circuit providing an output pulse signal at said first frequency with said output pulse signal initiated by said first signal source and terminated upon attainment of a given potential by said first charge storage network;

clamping circuit means coupled to said second signal source and responsive to a given level of said ramp pulse signal portion for effecting an output pulse signal advanced with respect to said flyback pulse signal portion; and second trigger circuit means coupled to said clamping circuit means and to said first trigger circuit means and responsive to said advanced output pulse signal from said clamping circuit means for initiating an output pulse signal from said first trigger circuit means with said output pulse signal terminated upon attainment of a given potential level by said second charge storage network.

2. The pulse width control circuit of claim 1 wherein said first and second signals are at the horizontal and vertical scan frequencies respectively of a television receiver.

3. The pulse width control circuit of claim 1 wherein said circuitry is in the form of an integrated circuit.

4. The pulse width control circuit of claim 1 wherein each of said first and second trigger circuit means includes a pair of transistors having interconnected base and collector electrodes.

5. The pulse width control circuit of claim 1 wherein said first charge storage network includes first and second resistors series coupling said first potential source to a potential reference level and a series connected diode and capacitor shunting said second resistor.

6. The pulse width control circuit of claim 1 wherein said clamping circuit means includes a capacitor coupling said second signal source to a transistor connected to circuit ground and to said second trigger circuit means with a resistor coupling said capacitor and transistor junction to circuit ground whereby said resistor controls the discharge of said capacitor and the clamping level of the circuitry.

7. In a television receiver having first and second potential sources, a horizontal pulse signal source, and a vertical deflection signal source providing a signal having a ramp portion and a flyback pulse portion, a pulse width control and advancing circuit comprising:

first and second charge storage networks having first and second time constants and coupled to said first and second potential sources respectively;

first trigger circuit means coupled to said horizontal pulse signal source and to said first and second charge storage means and providing an output pulse signal initiated by a pulse from said horizontal pulse signal source and terminated upon attainment of a given potential level by said first charge storage means;

clamping circuit means coupled to said vertical deflection signal source, said means responsive to a given potential level of said ramp portion of said signal for providing an output pulse signal advanced with respect to said flyback pulse portion of said signal; and second trigger circuit means coupled to said clamping circuit means and to said first trigger circuit means and responsive to said output pulse signal from said clamping circuit means for providing a threshold potential for said first trigger circuit means to effect initiation of an output pulse signal from said first trigger circuit means responsive to a potential developed at said second charge storage network for terminating said output pulse signal.

8. The pulse width control and advancing circuit of claim 7 wherein said first and second trigger circuit means each include a pair of transistors having interconnected base and collector electrodes.

9. The pulse width control and advancing circuit of claim 7 wherein said first trigger circuit means, horizontal pulse signal source, and first charge storage network combine to provide an output pulse signal at a frequency equal to and a width greater than a pulse signal from said horizontal pulse signal source.

10. The pulse width control and advancing circuit of claim 7 wherein said vertical deflection signal source, clamping circuit means, first and second trigger circuit means, and second charge storage network combine to provide an output pulse signal advanced with respect to and of a width greater than said flyback pulse portion of said vertical deflection signal.

* * * * *

UNITED STATES PATENT OFFICE
CERTIFICATE OF CORRECTION

PATENT NO. : 3,949,163
DATED : April 6, 1976
INVENTOR(S) : Dong Woo Rhee

It is certified that error appears in the above-identified patent and that said Letters Patent are hereby corrected as shown below:

Col. 1, line 15: Please delete "average peak white" and insert --- average and peak white ---.

Col. 2, line 11: Please delete "vertical signal" and insert --- vertical blanking signal ---.

Col. 3, line 22: Please delete "grounded electrode" and insert --- grounded emitter electrode ---.

Col. 4, line 44: Please delete "first circuit" and insert --- first trigger circuit ---.

Col. 4, line 45: Please delete "first circuit" and insert --- first trigger circuit ---.

Signed and Sealed this

Tenth Day of August 1976

[SEAL]

Attest:

RUTH C. MASON
Attesting Officer

C. MARSHALL DANN
Commissioner of Patents and Trademarks